(12) United States Patent
Aquilina et al.

(10) Patent No.: US 11,668,448 B2
(45) Date of Patent: *Jun. 6, 2023

(54) VEHICLE EXTERIOR LIGHTING SYSTEMS WITH TAILGATE MOUNTED BACKUP LAMPS

(71) Applicant: FORD GLOBAL TECHNOLOGIES, LLC, Dearborn, MI (US)

(72) Inventors: Anthony Nicholas Aquilina, Royal Oak, MI (US); Michael Bryan Vanbelle, Canton, MI (US); Corey M. Ross, Schaumburg, IL (US); Kenneth C. Meissner, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,430

(22) Filed: Jun. 1, 2022

(65) Prior Publication Data

US 2023/0029500 A1    Feb. 2, 2023

Related U.S. Application Data

(63) Continuation of application No. 17/386,099, filed on Jul. 27, 2021, now Pat. No. 11,378,247.

(51) Int. Cl.

| | | |
|---|---|---|
| *F21S 43/19* | (2018.01) | |
| *F21S 43/14* | (2018.01) | |
| *B60Q 1/30* | (2006.01) | |
| *F21W 107/10* | (2018.01) | |

(Continued)

(52) U.S. Cl.
CPC .............. *F21S 43/19* (2018.01); *B60Q 1/307* (2013.01); *F21S 43/14* (2018.01); *F21W 2103/45* (2018.01); *F21W 2107/10* (2018.01); *F21Y 2115/10* (2016.08)

(58) Field of Classification Search
CPC ............ B60Q 1/307; F21S 43/14; F21S 43/19
See application file for complete search history.

(56) References Cited

U.S. PATENT DOCUMENTS

| | | | |
|---|---|---|---|
| 6,350,049 B1 * | 2/2002 | Zimmermann | ........ B60Q 1/304 34/507 |
| 7,273,304 B2 | 9/2007 | Bischoff et al. | |
| 9,815,402 B1 * | 11/2017 | Salter | ................... G02B 6/0096 |

(Continued)

FOREIGN PATENT DOCUMENTS

DE    102014017354 B4    11/2018

OTHER PUBLICATIONS

Code of Federal Regulations, Title 49 Transportation, 571.108 section 108: Lamps, reflective devices, and associated equipment (Year: 2011).*

(Continued)

*Primary Examiner* — Matthew J. Peerce
(74) *Attorney, Agent, or Firm* — Vichit Chea; Carlson, Gaskey & Olds, P.C.

(57) ABSTRACT

Vehicle exterior lighting systems for vehicles equipped with tailgate assemblies may be configured to provide redundant backup lighting functionality for all tailgate positions (e.g., closed, open, and removed). Exemplary systems may include both vehicle static body structure mounted backup lamps and tailgate structure mounted backup lamps for providing the backup lighting redundancy.

18 Claims, 4 Drawing Sheets

(51) Int. Cl.
   *F21Y 115/10*     (2016.01)
   *F21W 103/45*     (2018.01)

(56) References Cited

U.S. PATENT DOCUMENTS 9,849,830 B1 * 12/2017 Salter .................. F21V 9/30
2016/0332563 A1 * 11/2016 Tseng ................ B60Q 1/30

OTHER PUBLICATIONS

The 2022 Ford F-150 Lightning EV Hasa Frunking Fantastic Storage, Motor Trend Network, Jun. 1, 2021 https://www.motortrend.com/news/2022-ford-f-150-lightning-ev-frunk-trunk-details/.
Karl Smith, "Wild Trapezoidal Tesla Truck Debuts in Los Angeles," Nov. 22, 2019, https://www.cardesignnews.com/cars/wild-trapezoidal-tesla-truck-debuts-in-los-angeles/39678.article (Year: 2019).

\* cited by examiner

VEHICLE EXTERIOR LIGHTING SYSTEMS WITH TAILGATE MOUNTED BACKUP LAMPS

CROSS REFERENCE TO RELATED APPLICATION

This is a continuation of U.S. patent application Ser. No. 17/386,099, which was filed on Jul. 27, 2021.

TECHNICAL FIELD

This disclosure relates generally to vehicle exterior lighting systems, and more particularly to vehicle exterior lighting systems that include both tailgate mounted backup lamps and vehicle static body structure mounted backup lamps.

BACKGROUND

Vehicle exterior lighting systems include a multitude of lighting and signaling devices for illuminating the vehicle and alerting others to the vehicle's presence and driving intentions. These lighting systems typically include lamp assemblies positioned at both the front and the rear of the vehicle.

SUMMARY

A vehicle exterior lighting system according to an exemplary aspect of the present disclosure includes, among other things, a first backup lamp mounted to a vehicle static body structure and a second backup lamp mounted to a vehicle tailgate assembly.

In a further non-limiting embodiment of the foregoing system, the first backup lamp is part of a vehicle tail lamp assembly.

In a further non-limiting embodiment of either of the foregoing systems, the vehicle tail lamp assembly further includes a combination lamp.

In a further non-limiting embodiment of any of the foregoing systems, the second backup lamp is part of an illuminating light bar module that is mounted to a tailgate structure of the tailgate assembly.

In a further non-limiting embodiment of any of the foregoing systems, the first backup lamp includes a first lens and a first set of light sources, and the second backup lamp includes a second lens and a second set of light sources.

In a further non-limiting embodiment of any of the foregoing systems, the first and second sets of light sources are light emitting diodes (LEDs).

In a further non-limiting embodiment of any of the foregoing systems, an illumination control module is programmed to simultaneously control the first backup lamp and the second backup lamp to provide a backup lighting effect.

In a further non-limiting embodiment of any of the foregoing systems, the illumination control module is programmed to command the backup lighting effect in response to receiving a signal that a vehicle shift device has been moved to a reverse driving gear.

In a further non-limiting embodiment of any of the foregoing systems, the illumination control module is programmed to control the second backup lamp to provide a zone lighting effect when the tailgate assembly is moved to a tailgate open position.

In a further non-limiting embodiment of any of the foregoing systems, the illumination control module is programmed to command the first backup lamp to provide the backup lighting effect when the tailgate assembly is removed from the vehicle static body structure.

A vehicle according to another exemplary aspect of the present disclosure includes, among other things, a vehicle static body structure, a tail lamp assembly mounted to the vehicle static body structure and including a first backup lamp, and a tailgate assembly removably mounted relative to the vehicle static body structure and including a tailgate structure that includes a wing portion. In a closed position of the tailgate assembly, the wing portion conceals the first backup lamp. In an open position of the tailgate assembly, the first backup lamp is uncovered by the wing portion and is exposed for selectively producing a backup lighting effect.

In a further non-limiting embodiment of the foregoing vehicle, the wing portion extends laterally outward of an outboard side of the tailgate structure to establish a widened section of the tailgate structure.

In a further non-limiting embodiment of either of the foregoing vehicles, the tail lamp assembly further includes a combination lamp that is uncovered by the wing portion regardless of whether the tailgate assembly is in the closed position or the open position.

In a further non-limiting embodiment of any of the foregoing vehicles, in a removed position of the tailgate assembly, the first backup lamp is exposed for selectively producing the backup lighting effect.

In a further non-limiting embodiment of any of the foregoing vehicles, the tailgate assembly includes an illuminating light bar module mounted to the tailgate structure, and the illuminating light bar module includes a second backup lamp.

In a further non-limiting embodiment of any of the foregoing vehicles, in the closed position of the tailgate assembly, the second backup lamp is configured to provide the backup lighting effect.

In a further non-limiting embodiment of any of the foregoing vehicles, the second backup lamp is configured to provide a zone lighting effect when the tailgate assembly is in the open position.

In a further non-limiting embodiment of any of the foregoing vehicles, an illumination control module is programmed to control the first backup lamp to provide the backup lighting effect in response to receiving a reverse driving signal from a shift device of the vehicle.

In a further non-limiting embodiment of any of the foregoing vehicles, the vehicle is a battery electric pickup truck.

A method according to another exemplary aspect of the present disclosure includes, among other things, during a reverse driving condition of a vehicle, producing a backup lighting effect with a first backup lamp of a tailgate assembly of the vehicle when the tailgate assembly is positioned in a closed position, and producing the backup lighting effect with a second backup lamp of a tail lamp assembly of the vehicle when the tailgate assembly is positioned in an open position or is removed from the vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
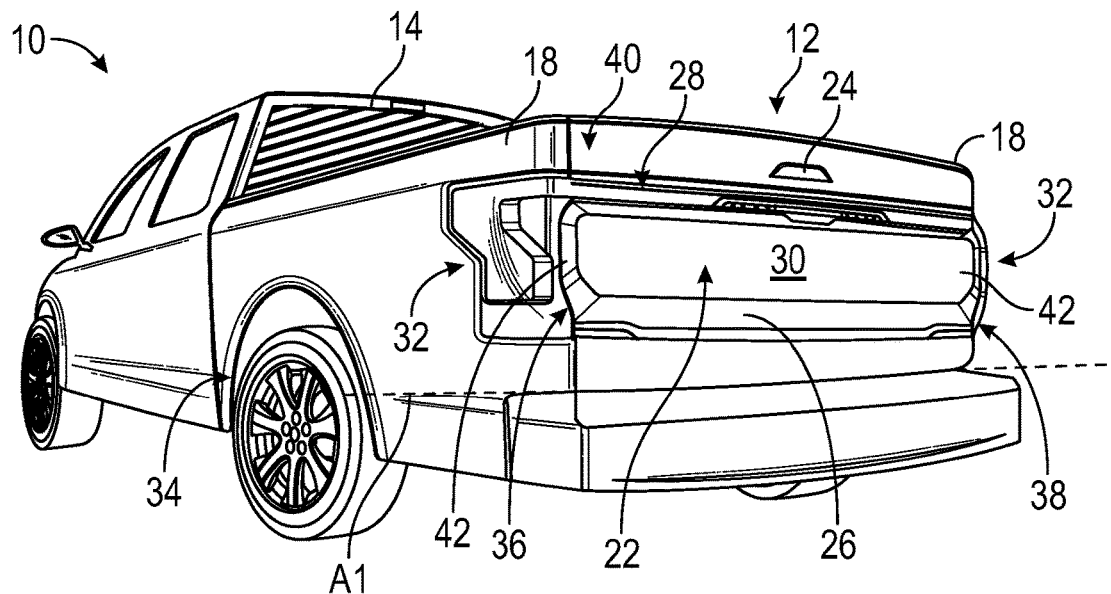
FIG. 1 is a rear perspective view of a motor vehicle equipped with a tailgate assembly and multiple lamp assemblies for providing vehicle exterior lighting.

This disclosure relates to vehicle exterior lighting systems for vehicles equipped with tailgate assemblies. The proposed systems are capable of providing redundant backup lighting functionality for all tailgate positions (e.g., closed, open, and removed). Exemplary systems may include both vehicle static body structure mounted backup lamps and tailgate structure mounted backup lamps for providing the backup lighting redundancy. These and other features of this disclosure are described in greater detail in the following paragraphs of this detailed description.

FIGS. 1, 2, 3, and 4 illustrate select portions of a motor vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 12 is generally rearward of a passenger cabin 14 of the vehicle 10 and includes a floor 16 (best shown in FIG. 3) extending between a pair of longitudinally extending side walls 18, a laterally extending front wall 20 (best shown in FIG. 3), and a tailgate assembly 22. The overall size, shape, and configuration of the cargo bed 12 are not intended to limit this disclosure.

Figure 2:
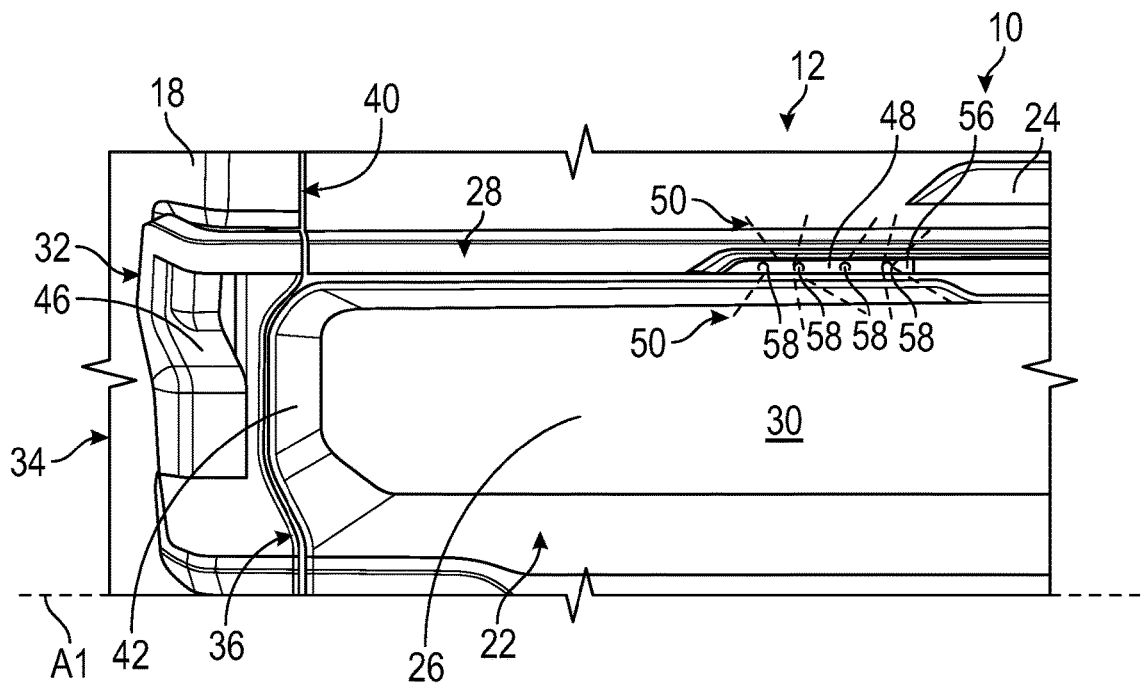
FIG. 2 is a blown-up view of portions of the rear of the vehicle of FIG. 1 with the tailgate assembly positioned in a tailgate closed position.
Figure 3:
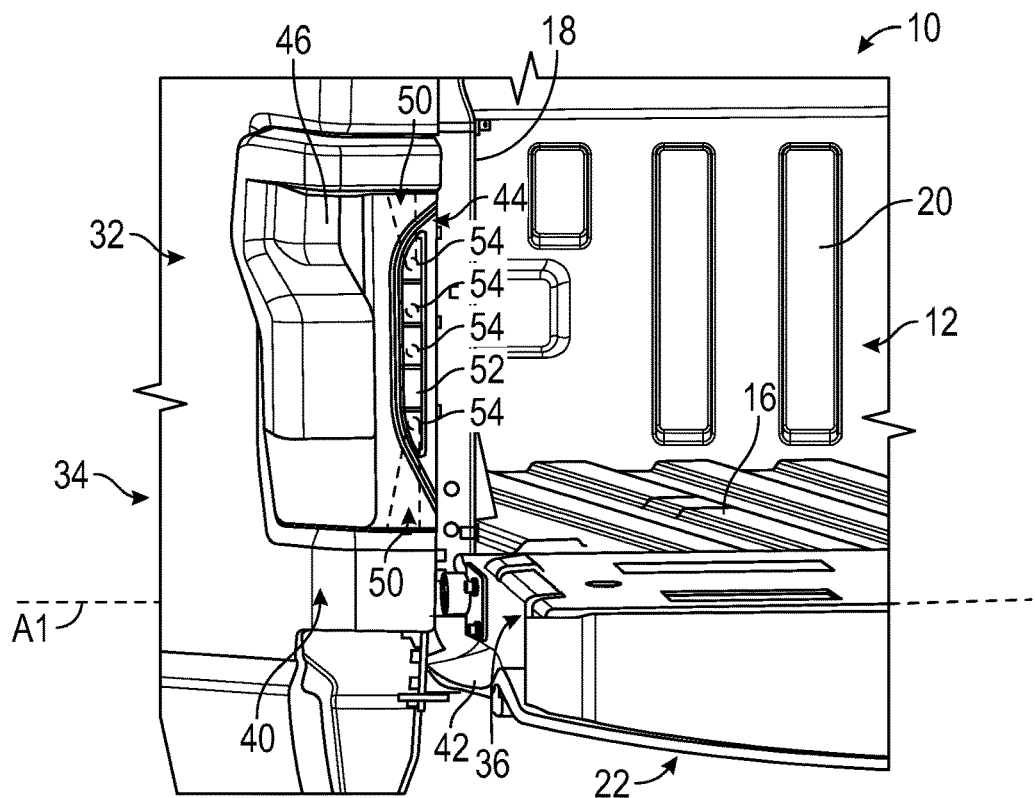
FIG. 3 is a blown-up view of portions of the rear of the vehicle of FIG. 1 with the tailgate assembly positioned in a tailgate open position.

The tailgate assembly 22 is pivotable about a first axis A1 relative to the cargo bed 12 between a tailgate closed position shown in FIGS. 1 and 2 and a tailgate open position shown in FIG. 3. The tailgate assembly 22 may be moved from the tailgate closed position to the tailgate open position in response to actuating a handle 24 of the tailgate assembly 22, for example. The tailgate assembly 22 is vertically aligned when in the tailgate closed position and thus generally encloses an end of the cargo bed 12 that is opposite from the front wall 20, and the tailgate assembly 22 is horizontally aligned when in the tailgate open position and thus generally allows access to the cargo bed 12. Vertical and horizontal, for purposes of this disclosure, are with reference to ground in the ordinary orientation of the vehicle 10 during operation.

The tailgate assembly 22 may include, among other things, a tailgate structure 26 and an illuminating light bar module 28 mounted to the tailgate structure 26. The illuminating light bar module 28 may include a multitude of lamps and signaling devices for providing exterior vehicle lighting, for alerting other drivers and/or pedestrians to the vehicle's presence and to the driving intentions of the vehicle 10, for providing trailer backup assist lighting, etc. The illuminating light bar module 28 may be mounted to a rear facing surface 30 of the tailgate structure 26 and may, in an embodiment, extend across an entire width of the rear facing structure 30.

The vehicle 10 may further be equipped with one or more tail lamp assemblies 32 located near a rear of the vehicle 10. Although not specifically shown, the vehicle 10 may additionally be equipped with one or more head lamp assemblies located near a front of the vehicle and various optional additional lamp assemblies around the perimeter of the vehicle 10. The total number of lamp assemblies provided on the vehicle 10 is not intended to limit this disclosure.

In an embodiment, the vehicle 10 is equipped with a pair of tail lamp assemblies 32. Each tail lamp assembly 32 may be mounted to a vehicle static body structure 34 of the vehicle 10 and is positioned to flank outboard sides 36, 38 of the tailgate structure 26. In an embodiment, each tail lamp assembly 32 is mounted to the vehicle static body structure 34 at an interface between one of the side walls 18 and the tailgate assembly 22.

In another embodiment, when the tailgate assembly 22 is in the tailgate closed position, the illuminating light bar module 28 has the appearance of establishing a subassembly of the tail lamp assemblies 32. Each tail lamp assembly 32 may include a multitude of lamps and signaling devices for providing exterior vehicle lighting and for alerting other drivers and/or pedestrians to the vehicle's presence and to the driving intentions of the vehicle 10.

Together, the tail lamp assemblies 32 and the illuminating light bar module 28 may establish substituent components of an exterior lighting system 40 of the vehicle 10. The exterior lighting system 40 may be configured for producing various lighting functions, including but not limited to, turn lights, backup lighting, braking lighting, etc. about the exterior of the vehicle 10.

Referring now primarily to FIGS. 2 and 3, the tailgate structure 26 may include a wing portion 42 provided at each of the outboard sides 36, 38 of the tailgate structure 26. Each wing portion 42 may extend laterally outward of its respective outboard side 36, 38 to establish a widened section of the tailgate structure 26. In an embodiment, the wing portions 42 establish a widened section of only the rear facing surface 30 of the tailgate structure 26. However, other configurations are further contemplated within the scope of this disclosure. Each wing portion 42 may be arranged to provide a visually distinctive and pleasing styling element to the tailgate assembly 22.

In addition to providing the styling elements, the wing portions 42 may further function to cover a portion of the tail lamp assemblies 32 when the tailgate assembly 22 is positioned in the tailgate closed position. Although only the driver-side wing portion 42 and driver-side tail lamp assembly 32 are shown in FIGS. 2-3, the passenger side of the vehicle 10 would include a similar arrangement that is essentially the mirror opposite of the driver side features.

In an embodiment, the wing portion 42 is configured to cover a backup lamp 44 (see FIGS. 3-4) of the tail lamp assembly 32 when the tailgate assembly 22 is positioned in the tailgate closed position shown in FIG. 2. A combination lamp 46 of the tail lamp assembly 32 is uncovered by the wing portion 42 regardless of whether the tailgate assembly 22 is in the tailgate closed position of FIG. 2 or the tailgate open position of FIG. 3.

Each backup lamp 44 may include one or more lenses 52 and one or more light sources 54. In an embodiment, the lenses 52 and light sources 54 of the backup lamp 44 are separate from the lenses/light sources of the combination lamp 46. The light sources 54 may be light emitting diodes (LEDs), halogen lamps, or any other suitable light source. Although not specifically shown, each tail lamp assembly 32 could additionally include various features such as reflectors, bezels, etc. for reflecting light, reducing glare, providing decorate surfaces, etc.

Since the backup lamp 44 of the tail lamp assembly 32 is concealed behind the wing portion 42 of the tailgate structure 26 during the tailgate closed position, the backup lighting function must be provided by another portion of the exterior lighting system 40. In an embodiment, the illuminating light bar module 28 of the tailgate assembly 22 may include an additional backup lamp 48. The backup lamp 48 may be configured to emit a backup lighting effect 50, such as when a transmission of the vehicle 10 is moved to a reverse (R) driving gear, for indicating the reverse driving intentions of the vehicle 10 to nearby vehicles and/or pedestrians during the tailgate closed position.

The backup lamp 48 may include one or more lenses 56 and one or more light sources 58. The light sources 54 may light emitting diodes (LEDs), halogen lamps, or any other suitable light source. Although not specifically shown, the illuminating light bar module 28 could include various additional features such as reflectors, bezels, etc. for reflecting light, reducing glare, providing decorate surfaces, etc.

The backup lamp 44 of each tail lamp assembly 32 is uncovered when the tailgate assembly 22 is moved to the tailgate open position of FIG. 3. In this tailgate position, the backup lamp 44 may be configured to emit the backup lighting effect 50 when the transmission of the vehicle 10 is moved to the reverse (R) driving gear for indicating the reverse driving intentions of the vehicle 10 to nearby vehicles and/or pedestrians. The backup lamps 44, 48 may therefore provide for the redundant backup lighting functionality of the exterior lighting system 40.

Figure 4:
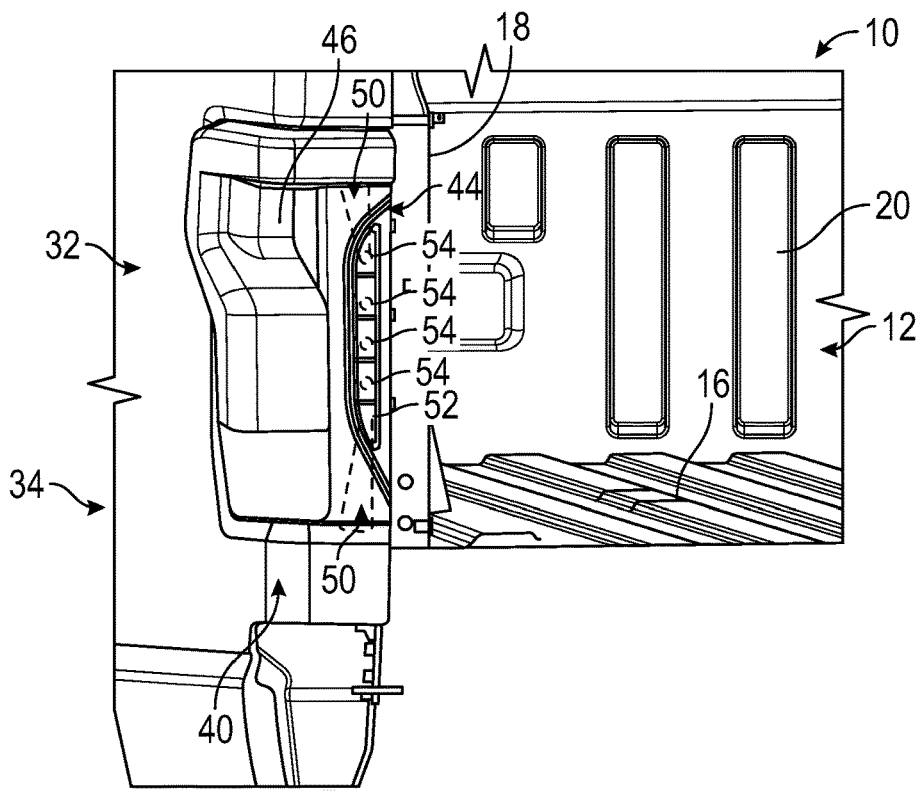
FIG. 4 is a blown-up view of portions of the rear of the vehicle of FIG. 1 with the tailgate assembly removed from the vehicle.

FIG. 4 illustrates the vehicle 10 with the tailgate assembly 22 removed from the vehicle static body structure 34. This may be referred to as a tailgate removed position of the tailgate assembly 22. In the tailgate removed position, the backup lamps 44 of the tail lamp assemblies 32 may be configured to emit the backup lighting effects 50 for indicating the reverse driving intentions of the vehicle 10 to nearby vehicles and/or pedestrians. The vehicle exterior lighting system 40 is therefore equipped to provide the backup lighting effect 50 no matter what position the tailgate assembly 22 is ultimately situated in.

Figure 5:
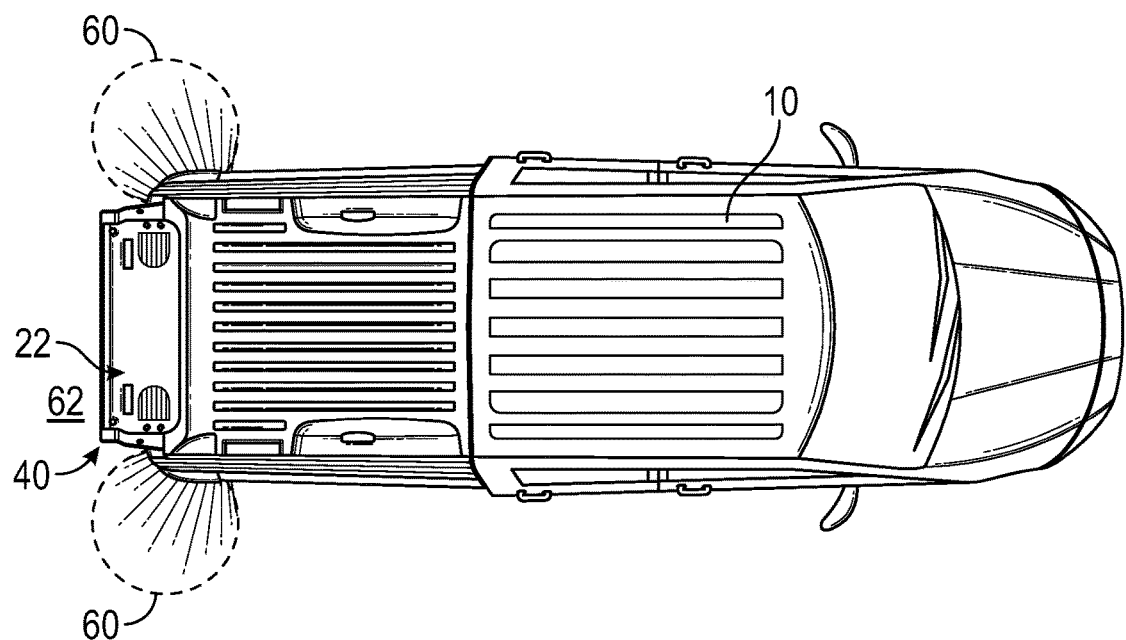
FIG. 5 schematically illustrates a zoned lighting feature that may be provided by a vehicle exterior lighting system.

FIG. 5, with continued reference to FIGS. 2-3, schematically illustrates additional lighting effects that may be provided by the exterior lighting system 40 of the vehicle 10 when the tailgate assembly 22 is moved to the tailgate open position. In an embodiment, the backup lamp 48 of the illuminating light bar module 28 of the tailgate assembly 22 may be configured to emit zone lighting effects 60 when the tailgate assembly 22 is in the tailgate open position. The zone lighting effects 60 may be provided in the form of wash lighting, puddle lighting, etc. that is projected onto a ground surface 62 beneath the tailgate assembly 22. The zone lighting effects 60 may improve a user's visibility at the rear of the vehicle 10 during relatively dark ambient lighting conditions, for example.

Figure 6:
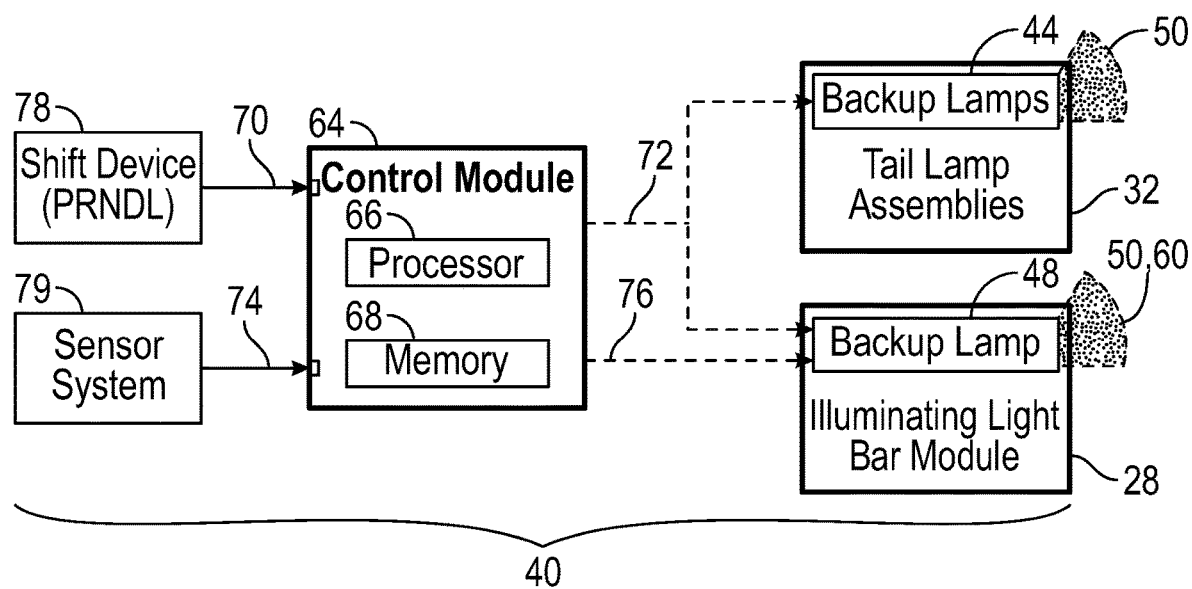
FIG. 6 is a block diagram illustrating exemplary aspects of a vehicle exterior lighting system.

FIG. 6, with continued reference to FIGS. 1-5, is a block diagram for schematically illustrating the functionality of the exterior lighting system 40. The backup lamps 44 of the tail lamp assemblies 32 and the backup lamp 48 of the illuminating light bar module 28 of the tailgate assembly 22 may be activated together for producing the backup lighting effects 50 in response to commands from an illumination control module 64.

The illumination control module 64 may be equipped with executable instructions for interfacing with and commanding operation of various components of the exterior lighting system 40, including but not limited to, the respective light sources of the backup lamps 44 of the tail lamp assemblies 32 and the backup lamp 48 of the illuminating light bar module 28. The illumination control module 64 may include a processing unit 66 and non-transitory memory 68 for executing the various control strategies and modes of the exterior lighting system 40. The processing unit 66 can be programmed to execute one or more programs stored in the memory 68. The program may be stored in the memory 68 as software code, for example. Each program stored in the memory 68 may include an ordered list of executable instructions for implementing logical functions associated with the tail lamp assemblies 32 and the illuminating light bar module 28. The processing unit 66 can be a custom made or commercially available processor, a central processing unit (CPU), or generally any device for executing software instructions. The memory 68 can include any one or combination of volatile memory elements and/or nonvolatile memory elements.

The illumination control module 64 may be programmed, in an embodiment, to command illumination of the backup lamps 44, 48 in response to receiving a signal 70 from a shift device 78 of the vehicle 10. The shift device 78 may be located within the passenger cabin 14 (see FIG. 1) of the vehicle 10 and is generally used to change a gear of a transmission of the vehicle 10. For example, the shift device 78 may be used to shift the transmission into park (P), reverse (R), neutral (N), drive (D), low (L), etc. The shift device 78 could be a shift lever movable to change the gear or an electronic shift device that includes one or more joysticks, dials, and/or buttons for changing the gear.

In an embodiment, the signal 70 indicates that the shift device 78 of the vehicle 10 has been shifted into the reverse (R) driving gear, thus indicating that the backup lighting effect 50 is necessary. In response to receiving the signal 70, the illumination control module 64 may communicate a backup lighting effect command signal 72 simultaneously to the backup lamps 44, 48 for producing the backup lighting effects 50. The backup lamps 44, 48 are therefore activated together for providing backup lighting redundancy for all tailgate assembly 22 positions.

The illumination control module 64 may be further programmed, in another embodiment, to command illumination of the backup lamp 48 of the illuminating light bar module 28 in response to receiving a tailgate open status signal 74 from a sensor system 79 that is adapted to monitor a position status of the tailgate assembly 22. In an embodiment, the tailgate open status signal 74 indicates that the tailgate assembly 22 has been moved to the tailgate open position, thus indicating that the zone lighting effect 60 is desired/needed. In response to receiving the tailgate open status signal 74, the illumination control module 64 may communicate a zone lighting effect command signal 76 to the backup lamp 48 for producing the zone lighting effect 60. The illumination control module 64 may be programmed to command various other lighting effects of the exterior lighting system 40 within the scope of this disclosure.

Figure 7:
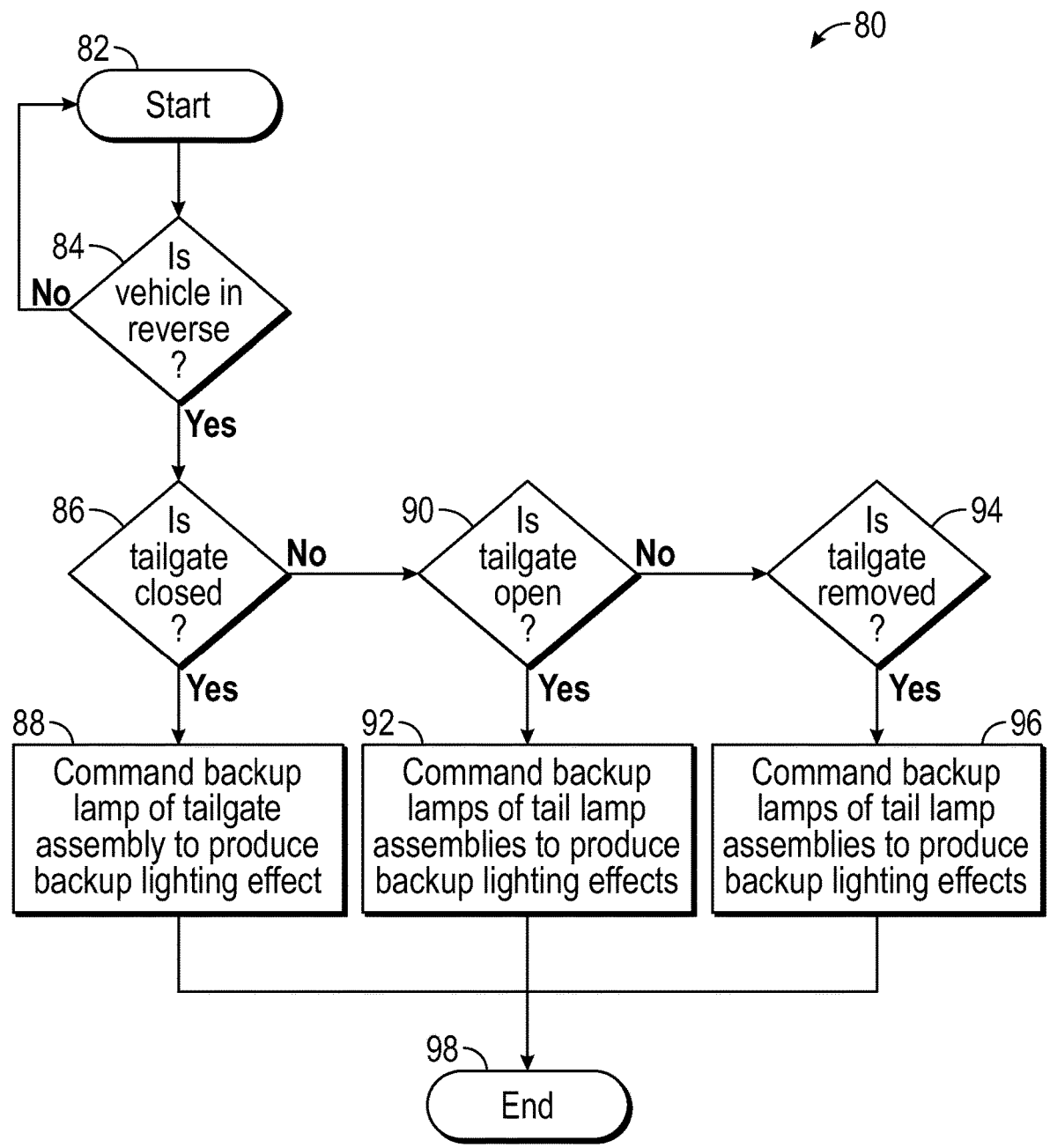
FIG. 7 schematically illustrates an exemplary control strategy for controlling a vehicle exterior lighting system for producing backup lighting effects.

FIG. 7, with continued reference to FIGS. 1-6, schematically illustrates a method 80 for controlling the exterior lighting system 40 of the vehicle 10 to provide the backup lighting effect 50 during various vehicle conditions. In an embodiment, the illumination control module 64 is programmed with one or more algorithms adapted to execute the exemplary method 80.

The exemplary method 80 may begin at block 82. At block 84, the method 80 determines whether the shift device 78 of the vehicle 10 has been shifted into the reverse (R) driving gear. In an embodiment, the shift device 78 provides the signal 70 to the illumination control module 64 when the shift device 78 is positioned in reverse.

The method 80 may proceed to block 86 when the vehicle 10 is in the reverse driving gear. At this step, the method 80 may determine, based on inputs from the sensor system 79, whether the tailgate assembly 22 is in the tailgate closed position. If YES, the illumination control module 64 may command the backup lamp 48 of the illuminating light bar module 28 of the tailgate assembly 22 to produce the backup lighting effect 50 at block 88. Although the backup lamps 44 of the tail lamp assemblies 32 may also be illuminated, these lamps are not visible as a result of the backup lamps 44 being concealed behind the wing portions 42 of the tailgate structure 26.

The method 80 may alternatively proceed to block 90 when the tailgate assembly 22 is determined to be in a position that is not the tailgate closed position. At this step, the method 80 may determine, based on inputs from the sensor system 79, whether the tailgate assembly 22 is in the tailgate open position. If YES, the illumination control module 64 may command the backup lamps 44 of the tail lamp assemblies 32 to produce the backup lighting effects 50 at block 92. Although the backup lamp 48 of the illuminating light bar module 28 may also be illuminated, the lighting effect produced has the appearance of the zone lighting effect 60 since the tailgate assembly 22 is in the tailgate open position.

The method 80 may alternatively proceed to block 94 when the tailgate assembly 22 is determined to be in a position that neither the tailgate closed position nor the tailgate open position. At this step, the method 80 may determine, based on inputs from the sensor system 79, whether the tailgate assembly 22 is in the tailgate removed position. If YES, the illumination control module 64 may command the backup lamps 44 of the tail lamp assemblies 32 to produce the backup lighting effects 50 at block 96. The method 80 may then end at block 98.

The vehicle exterior lighting systems of this disclosure incorporate redundant backup lamps for providing backup lighting effects for any and all possible tailgate positions, including tailgate removed positions. At least one set of backup lamps is configured to be exposed for providing the backup lighting effects for each of the tailgate closed, open, and removed positions. Incorporating backup lamps into the tailgate structure further provides a unique styling appearance to the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
   a vehicle static body structure;
   a tail lamp assembly mounted to the vehicle static body structure and comprising a first backup lamp and a combination lamp;
   a tailgate assembly movably mounted relative to the vehicle static body structure and comprising a tailgate structure that includes a laterally outward extending wing portion; and
   the first backup lamp is concealed by the wing portion when the tailgate assembly is closed and is uncovered by the wing portion when the tailgate assembly is opened,
   wherein the first backup lamp and the combination lamp are part of a common unit of the tail lamp assembly that is mounted to a side wall of a cargo bed of the vehicle static body structure.

2. The vehicle as recited in claim 1, wherein the wing portion extends laterally outward of an outboard side of the tailgate structure to establish a widened section of the tailgate structure.

3. The vehicle as recited in claim 1, wherein the combination lamp is uncovered by the wing portion regardless of whether the tailgate assembly is closed or opened.

4. The vehicle as recited in claim 1, wherein, in a removed position of the tailgate assembly, the first backup lamp is exposed for selectively producing a backup lighting effect of the vehicle.

5. A vehicle, comprising:
   a vehicle static body structure;
   a tail lamp assembly mounted to the vehicle static body structure and comprising a first backup lamp and a combination lamp;
   a tailgate assembly movably mounted relative to the vehicle static body structure and comprising a tailgate structure that includes a laterally outward extending wing portion; and the first backup lamp is concealed by the wing portion when the tailgate assembly is closed and is uncovered by the wing portion when the tailgate assembly is opened, wherein the tailgate assembly includes an illuminating light bar module mounted to the tailgate structure, and further wherein the illuminating light bar module includes a second backup lamp.

6. The vehicle as recited in claim 5, comprising an illumination control module programmed to activate the first backup lamp and the second backup lamp together for providing backup lighting redundancy for all positions of the tailgate assembly.

7. The vehicle as recited in claim 5, wherein, when the tailgate assembly is closed, the second backup lamp is configured to provide a backup lighting effect of the vehicle.

8. The vehicle as recited in claim 5, wherein the second backup lamp is configured to provide a zone lighting effect when the tailgate assembly is opened.

9. The vehicle as recited in claim 8, wherein the zone lighting effect includes wash lighting or puddle lighting.

10. The vehicle as recited in claim 5, wherein the illuminating light bar module extends across a majority of a width of the tailgate structure.

11. The vehicle as recited in claim 5, wherein, when the tailgate assembly is closed, the illuminating light bar module has the appearance of establishing a subassembly of the tail lamp assembly.

12. The vehicle as recited in claim 1, comprising an illumination control module programmed to control the first backup lamp to provide a backup lighting effect of the vehicle in response to receiving a reverse driving signal from a shift device of the vehicle.

13. The vehicle as recited in claim 1, wherein the vehicle is a battery electric pickup truck.

14. The vehicle as recited in claim 1, wherein a first lens and a first light source of the first backup lamp are separate components from a second lens and a second light source of the combination lamp.

15. A vehicle, comprising:
a tail lamp assembly including a first backup lamp and a combination lamp;
a tailgate assembly movably mounted relative to the tail lamp assembly;
the first backup lamp is concealed by the tailgate assembly when the tailgate assembly is in a closed position and is uncovered when the tailgate assembly is in an open position; and
the combination lamp is uncovered by the tailgate assembly regardless of whether the tailgate assembly is in the closed position or the open position,
wherein the first backup lamp is concealed by a wing portion of the tailgate assembly, and the wing portion extends laterally outward of an outboard side of a tailgate structure of the tailgate assembly to establish a widened section of the tailgate structure,
wherein the tailgate assembly includes an illuminating light bar module that comprises a second backup lamp.

16. The vehicle as recited in claim 15, wherein the wing portion establishes the widened section at only a rear facing surface of the tailgate structure.

17. The vehicle as recited in claim 15, wherein, when the tailgate assembly is in the closed position, the illuminating light bar module has the appearance of establishing a subassembly of the tail lamp assembly.

18. The vehicle as recited in claim 15, wherein a first lens and a first light source of the first backup lamp are separate components from a second lens and a second light source of the combination lamp.

* * * * *